No. 622,358. Patented Apr. 4, 1899.
G. & F. E. HOFFMANN.
COMBINED CULTIVATOR AND CORN AND COTTON PLANTER.
(Application filed Oct. 29, 1898.)

(No Model.) 3 Sheets—Sheet 1.

Witnesses
Jas. K. McCathran
D. T. Holhauster

Gustav Hoffmann  Inventors
Fritz E. Hoffman
By their Attorneys,
C. A. Snow & Co.

No. 622,358. Patented Apr. 4, 1899.
G. & F. E. HOFFMANN.
COMBINED CULTIVATOR AND CORN AND COTTON PLANTER.
(Application filed Oct. 29, 1898.)
(No Model.) 3 Sheets—Sheet 2.
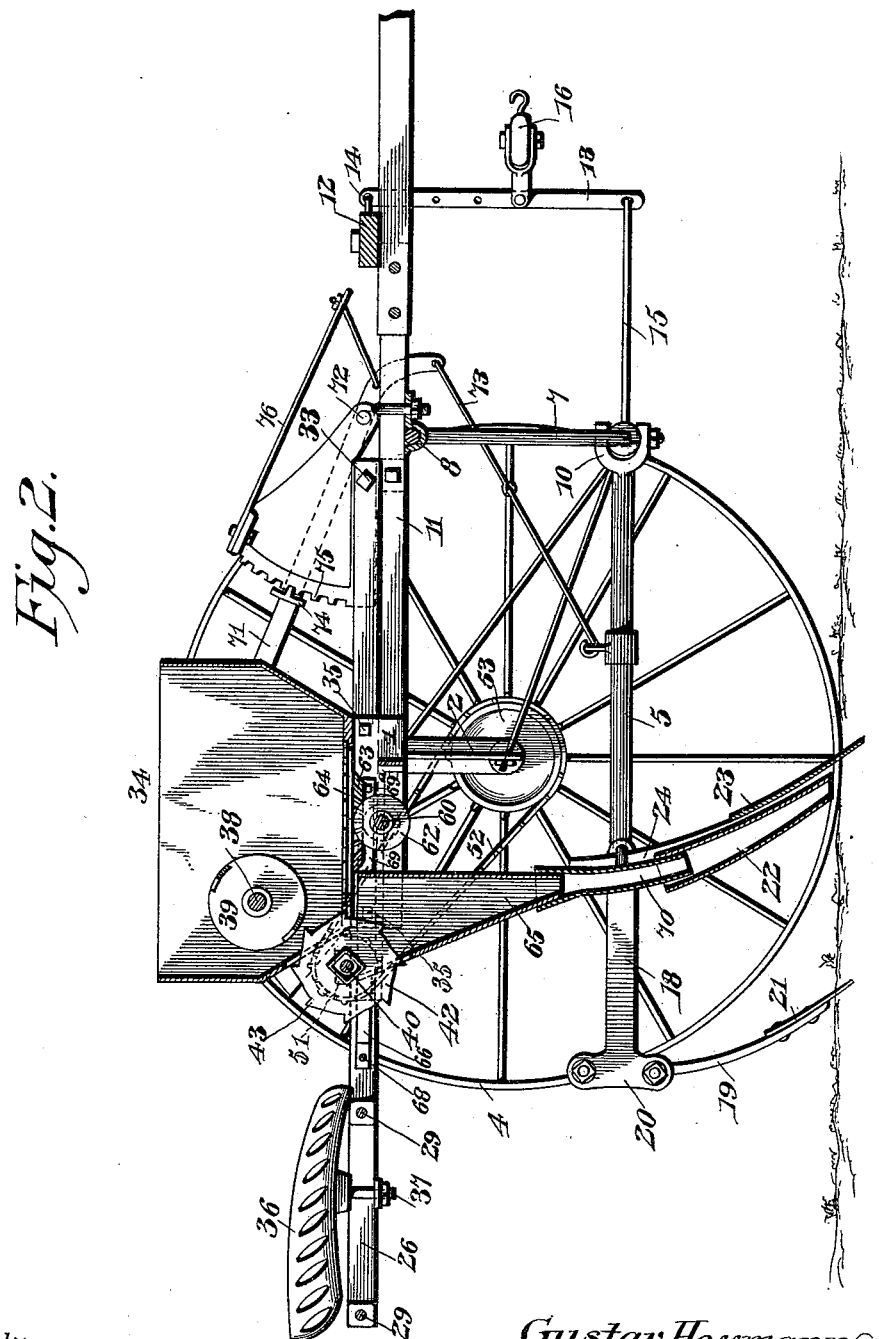
Fig. 2.
Witnesses
Gustav Hoffmann  
Fritz E. Hoffmann  
Inventors
By their Attorneys, No. 622,358. Patented Apr. 4, 1899.
G. & F. E. HOFFMANN.
COMBINED CULTIVATOR AND CORN AND COTTON PLANTER.
(Application filed Oct. 29, 1898.)
(No Model.)
3 Sheets—Sheet 3.
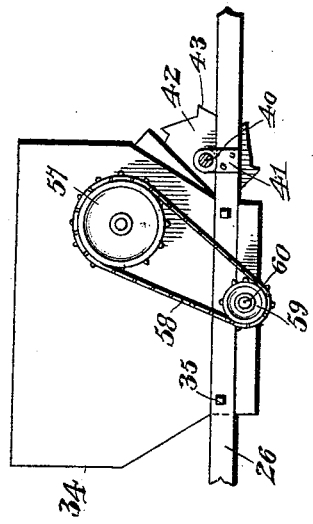
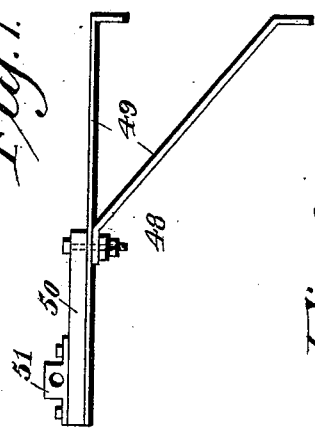
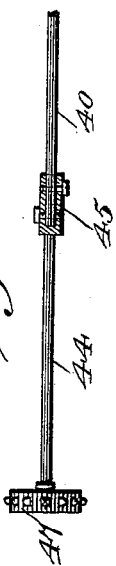
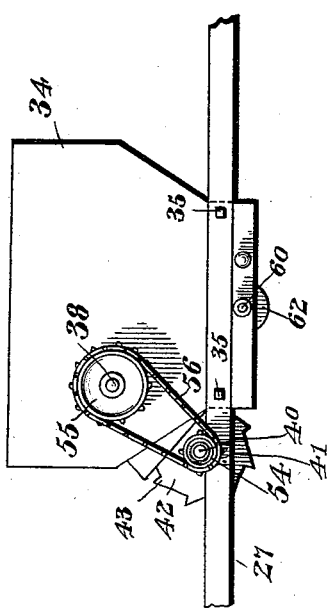
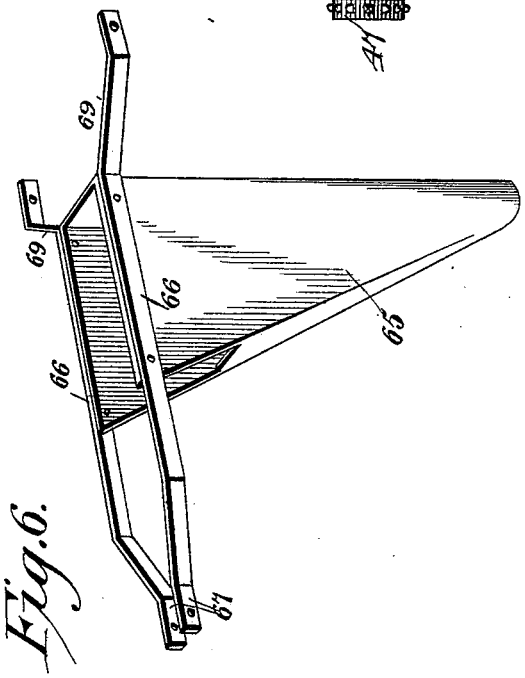
Witnesses
Jas. W. McCathran
D. T. Hollingster.
Gustav Hoffmann
Fritz E. Hoffmann
Inventors
By their Attorneys,
C. A. Snow & Co.
THE NORRIS PETERS CO., PHOTO-LITHO., WASHINGTON, D. C.

UNITED STATES PATENT OFFICE.

GUSTAV HOFFMANN AND FRITZ E. HOFFMANN, OF SOLMS, TEXAS.

COMBINED CULTIVATOR AND CORN OR COTTON PLANTER.

SPECIFICATION forming part of Letters Patent No. 622,358, dated April 4, 1899.

Application filed October 29, 1898. Serial No. 694,964. (No model.)

*To all whom it may concern:*

Be it known that we, GUSTAV HOFFMANN and FRITZ E. HOFFMANN, citizens of the United States, residing at Solms, in the county of Comal and State of Texas, have invented a new and useful Combined Cultivator and Corn or Cotton Planter, of which the following is a specification.

Our invention relates to improvements in combined cultivators and corn and cotton planters; and the object is to provide means adapted for use in connection with an ordinary cultivator to convert the latter into a machine for planting corn or dropping cotton-seed from a hopper.

A further object of the invention is to provide means by which the agitator device and the corn-planting or cotton-dropping devices may be actuated from a single driving-sprocket on one of the carrying-wheels of the machine.

A further object of the invention is to provide means adapted to convey the seed without loss from the hopper to the hoe-tube of the furrow-opener, and said seed-conducting devices embrace means arranged to obviate injury to the working parts in case the furrow-opener meets with an obstruction.

With these ends in view our invention consists in the novel construction and arrangement of parts which will be hereinafter fully described and claimed.

To enable others to understand the invention, we have illustrated the same in the accompanying drawings, forming a part of this specification, and in which—

Figure 1:
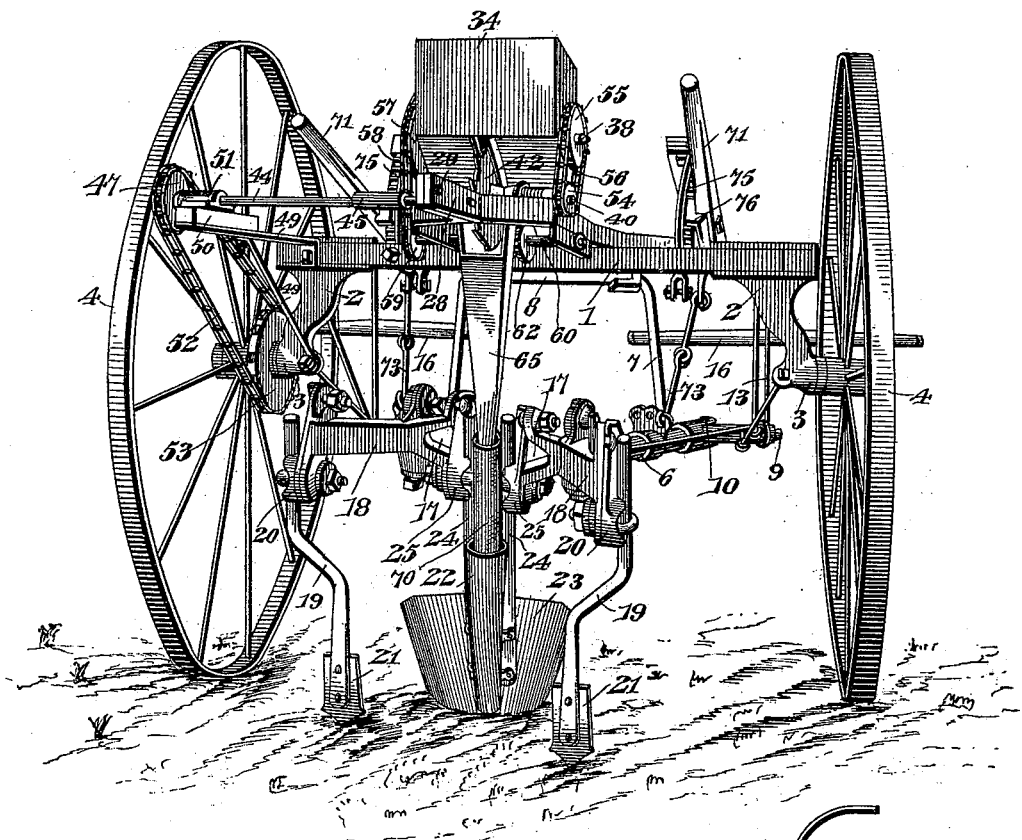
Figure 5:
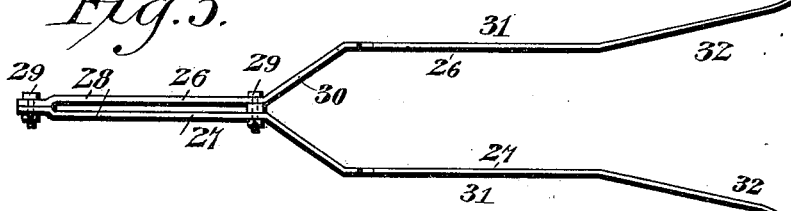

Figure 1 is a perspective view looking at the rear of the machine. Fig. 2 is a vertical longitudinal sectional elevation of the machine. Figs. 3 and 4 are elevations of opposite sides of the seed-hopper. Fig. 5 is a plan view of the frame designed to support the seed-hopper and the driver's seat. Fig. 6 is a perspective view of the seed-tube and the means for attaching the same to the hopper and seat frame. Fig. 7 is a detail view in elevation of the bracket adapted to support an extension of the cotton-dropping-disk shaft. Fig. 8 is a detail sectional elevation of the extension-shaft designed to be supported by the bracket shown by Fig. 7.

Like numerals of reference denote like and corresponding parts in each of the several figures of the drawings.

The carrying-axle of the cultivator is indicated by the numeral 1, and it is equipped with the usual hangers 2, which sustain the spindles 3, that accommodate the carrying-wheels 4 of the implement. The shovel-beams 5 6 are supported at their front ends by the hanger 7, which is mounted in a bearing 8 on the main frame 11 of the machine, and this hanger has its arms 9 united by the couplings or joints 10 to the front ends of the shovel-beams. The main frame 11 is similar in all substantial respects to the ordinary implements of this class, and it supports the transverse draft-beam 12. The vertical draft-bars 13 are pivotally or loosely connected at 14 to the draft-beam, and the lower ends of these draft-bars are connected by the links 15 to the shovel-beams or the hanger 7 thereof. As is usual, the vertical draft-bars carry the whiffletree 16, to which the draft-animals are designed to be hitched.

The shovel-beams 5 6 are each provided at the rear end with a forked carrier or casting 17, and each carrier is constructed to support a shovel-standard 19 and one of the bars that holds the hoe-tube and the furrow-opener in place. The carrier 17 has an arm 18 extended rearwardly beyond the hoe-tube, and on this extended arm 18 is supported a clamp 20, that receives a shovel-standard 19, the latter carrying a covering-shovel 21. The clamp and the shovel-standard are constructed to permit vertical adjustment as well as axial adjustment of the standard within the clamp, and provision is thus made for regulating the depth of penetration of the shovel and the obliquity of the latter to the line of draft.

The hoe-tube 22 is of metal, and to it is rigidly secured a furrow-opening blade 23 of any suitable pattern. This tube and furrow-opener are disposed in vertical positions between the shovel-beams, and they are designed to be supported on the forked carriers 17. Supporting-rods 24 are secured rigidly to the rear side of the furrow-opener 23 or to opposite sides of the hoe-tube, and these rods extend upwardly from the blade 23, so as to fit the clamps 25, which are mounted on the carrier 17 of the two shovel-beams. These supporting-rods may be adjusted in the clamps 25 to regulate the depth of the furrow opened by the blade 23, and the opening and covering shovels are thus mounted on the shovel-beams for adjustment independently thereon.

For supporting the seed-hopper and the driver's seat on the frame 11 of an ordinary cultivator we provide a horizontal frame, which is shown more clearly by Fig. 5. This frame consists of two bars or members 26 27, which have their straight parallel portions 28 united firmly together by the bolts 29. The frame bars or members 26 27 diverge or spread from the front bolt 29, as indicated at 30, in order to space the bars a proper distance apart to receive the seed-tube, and from the spread portions 30 the bars are carried forward in parallelism, as at 31, to accommodate the seed-hopper, after which the bars are again spread, as at 32, to properly fit the members of the main frame 11. The extreme front ends of the diverging bars forming the horizontal seat and hopper frame are securely fastened to the frame 11 by bolts, as at 33; but it is evident that this horizontal frame 26 27 may be secured firmly in place to the frame 11 by means other than the bolts.

The cotton-seed or the corn which is to be planted by our machine is designed to be contained in a hopper 34, which is mounted upon the parallel lengths 31 of the frame 26 27, said hopper being securely bolted at 35 to the said frame in a manner to permit of ready removal, adjustment, and reversal of the hopper, according as the machine is to be used for dropping cotton-seed or for planting corn.

A seat 36 of ordinary construction is fitted on the parallel rear lengths 28 of the horizontal frame, and this seat is secured in place by a bolt or bolts 37, which passes through the slot or opening which is formed between the lengths 28 at the rear extremity of this rear horizontal frame.

In the side walls of the hopper 34 is journaled a rotary shaft 38, which carries an agitator 39. In bearings 41, provided on the seat and hopper frame in rear of the hopper 34, is journaled a rotary cotton-dropping shaft 40, and on this shaft is rigidly secured the cotton-dropping disk 42. This cotton-dropping disk rotates in a vertical plane within a suitable slot or opening provided in the rear sloping wall of the hopper 34, and said disk is provided at its edge with a plurality of tangential teeth 43, that are adapted to engage with the cotton-seed in the hopper and force the same through an opening in the bottom of the hopper, so as to be discharged into the seed-tube. The rotary shaft 40 has one end extended beyond its bearing, and a shaft extension 44 is united detachably to this end of the shaft 40 by a coupling 45, one form of which is represented by Fig. 8. The extension 44 of the shaft 40 terminates adjacent to one of the carrying-wheels 4, and on this distal end of the extension-shaft is secured a sprocket-wheel 47. The outer end of the extension-shaft 44 is supported by a bracket 48, that is secured detachably to the axle and one of its hangers. This bracket (shown more clearly by Fig. 7) has arms 49, which are designed to be bolted firmly to the axle and a hanger thereof, and said arms are bolted to a rail 50, which is equipped with a shaft-bearing 51, that is adapted to receive the extension-shaft 44 for the purpose of supporting the latter securely in place, and thus maintain the alinement of the extension-shaft 44 with the cotton-dropping shaft 40. A chain belt 52 connects the sprocket 47 of the extension-shaft with a driving-sprocket 53, which is secured firmly to one of the carrying-wheels 4, whereby the rotation of the wheel serves to propel the extension-shaft 44 and dropping-shaft 40 through the described sprocket-gearing.

The end of the shaft 40 opposite to the coupling 45 is provided with a sprocket-wheel 54, which is in the vertical plane of a sprocket-wheel 55 on the agitator-shaft 38, and these sprocket-wheels 54 55 are operatively connected by an endless chain belt 56, (see Fig. 3,) whereby the agitator-shaft is driven from the dropping-shaft 40. The other end of the agitator-shaft 38 has a sprocket-gear 57, that accommodates a chain belt 58, which passes around a sprocket-wheel 59 on one end of a horizontal shaft 60, (see Fig. 4,) thus adapting the shaft 60 to be driven from the agitator-shaft. This shaft 60 extends across the bottom of the hopper, and it is journaled in suitable bearings on the frame 26 27. Said shaft is provided with a beveled pinion 62, which meshes with the bevel-teeth 63 on the under face of a corn-dropping disk 64, as shown by Fig. 2. This dropping-disk may be of the usual construction, and its pockets are arranged to discharge their contents to the seed-tube 65. This seed-tube is made of metal, and it is tapered from its large upper end to its lower discharge end, and this seed-tube is suspended from the horizontal frame 26 27 in a position immediately beneath the hopper 34. To the sides of the seed-tube, at the upper end thereof, are secured the supporting-bars 66, which are bent to have their rear ends 67 lie close together and to be secured firmly at 68 to the bars 26 27 of the horizontal frame. The front ends of the supporting-bars 66 are spread at 69, and they are fastened to the seat-frame by bolts 69ª, as shown by Fig. 2. This seed-tube 65 is suspended from the horizontal frame to have its lower extremity terminate above and substantially in alinement with the hoe-tube 22, and the space between this tube 22 and the seed-tube 65 is spanned by a flexible tube or hose 70, the upper end of which is suitably attached to the tube 65, while its lower end fits loosely in the hoe-tube 22, whereby any strain or shock sustained by the furrow-opener when it encounters an obstruction is not transmitted by the flexible tube or hose to the seed-tube 65 or the operating mechanisms of the planter.

As is usual in the art, the cultivator is equipped with means by which the shovel-beams may be raised or lowered, and in connection with each beam we employ a lever 71, which is fulcrumed at 72 on the main frame. The front end of this lever is connected by a link 73 to a shovel-beam in rear of the union or coupling 10 between the hanger and said beam, and this lever carries a suitable latch 74, adapted to engage with a toothed segment 75, suitably secured to the frame 11. The lever may be operated to raise the shovel-beam to a desired position, and the elevation of the shovel-beam is assisted by a lifting-spring 76, which, as shown by Fig. 2, is attached to the segment 75 or to a part of the main frame 11, while its other end is arranged to act against the adjusting-lever 71.

From the foregoing description, taken in connection with the drawings, it will be seen that we have provided devices which are simple in construction and are readily applicable to ordinary wheeled cultivators to adapt the latter for use as corn or cotton planters, according to the adjustment of the hopper and the planting devices which may for the time being be in service. Our improvements contemplate the provision of devices for opening the furrow and for throwing the soil upon the seed which may be deposited in the furrow, and these devices are all detachably fastened to the ordinary shovel-beams in a manner for vertical adjustment thereon.

It is thought that the construction and the mode of operation of our improvements will be readily understood by those skilled in the art from the foregoing description, taken in connection with the drawings.

Changes may be made in the form of some of the parts while their essential features are retained and the spirit of the invention embodied. Hence we do not desire to be limited to the precise form of all the parts as shown, reserving the right to vary therefrom.

Having thus described the invention, what we claim is—

1. The combination with a cultivator-frame, and carrying-wheels therefor, of an independent frame secured firmly to the cultivator-frame and carrying a hopper and a planting mechanism, gearing between one of the carrying-wheels and the said planting mechanism, a seed-conducting tube having bars attached to said independent frame, and other seed-tubes attached to the cultivator-frame and communicating with the first-named seed-conducting tube, substantially as described.

2. The combination with a cultivator-frame, and carrying-wheels therefor, of an independent frame attachable firmly to the cultivator-frame and provided at its rear extremity with a seat, a seed-hopper having planting devices and mounted on said independent frame, and gearing between one of the carrying-wheels and the planting mechanism, substantially as described.

3. A seat and hopper frame consisting of bars or members united firmly together and having their front ends spread or diverged, in combination with a cultivator-frame to which the seat and hopper frame is securely fastened, a seat supported by the rear end of said frame, and a hopper mounted on the frame in advance of the seat, substantially as described.

4. The combination with a cultivator-frame, of an independent frame secured thereto, a hopper supported by the independent frame, and a seed-tube suspended from the frame to receive seed from a planting mechanism in said hopper, substantially as described.

5. The combination with a cultivator-frame, of an independent frame united to the cultivator-frame and carrying a seat, a hopper mounted on the independent frame, a seed-tube arranged between the independent frame to receive seed from the hopper, and supporting-bars fixed to the seed-tube and to the independent frame, substantially as described.

6. The combination with a cultivator-frame, and the shovel-beams, of an independent frame secured to the cultivator-frame and provided with a seed-hopper and planting devices, carriers fast with the shovel-beams and having the shovel-standards, a hoe-tube supported by the carriers, and a seed-tube attached to the independent frame to receive grain or seed from the hopper and having its lower end arranged to deliver to the hoe-tube, substantially as described.

7. The combination with a cultivator-frame and shovel-beams below said frame, of an independent frame attached to the cultivator-frame and carrying a hopper, a hoe-tube having a furrow-opener and having means for connecting the same to the shovel-beams, a seed-tube suspended from the independent frame, and a flexible tube or hose connected to the seed-tube and fitted loosely in the hoe-tube, substantially as described.

8. The combination with a cultivator-frame and carrying-wheels therefor, of an independent frame attached to the cultivator-frame, a hopper mounted on the independent frame and having an agitator-shaft, a dropping-shaft geared to the agitator-shaft and having an extension, a fixed bracket provided with a shaft-bearing for the extension of the dropping-shaft, and gearing between one of the carrying-wheels and the shaft extension, substantially as described.

9. The combination with a cultivator-frame and carrying-wheels therefor, of an independent frame attached to the cultivator-frame, a hopper mounted on the independent frame and having a planting mechanism, a dropping-shaft, a fixed bracket with a shaft-bearing, an extension-shaft coupled detachably to the dropping-shaft and journaled in a shaft-bearing of said bracket, and gearing between the extension-shaft and one of the carrying-wheels, substantially as described.

In testimony that we claim the foregoing as our own we have hereto affixed our signatures in the presence of two witnesses.

GUSTAV HOFFMANN.
FRITZ E. HOFFMANN.

Witnesses:
PETER J. LENZEN,
PETER HUBERTUS.